UNITED STATES PATENT OFFICE.

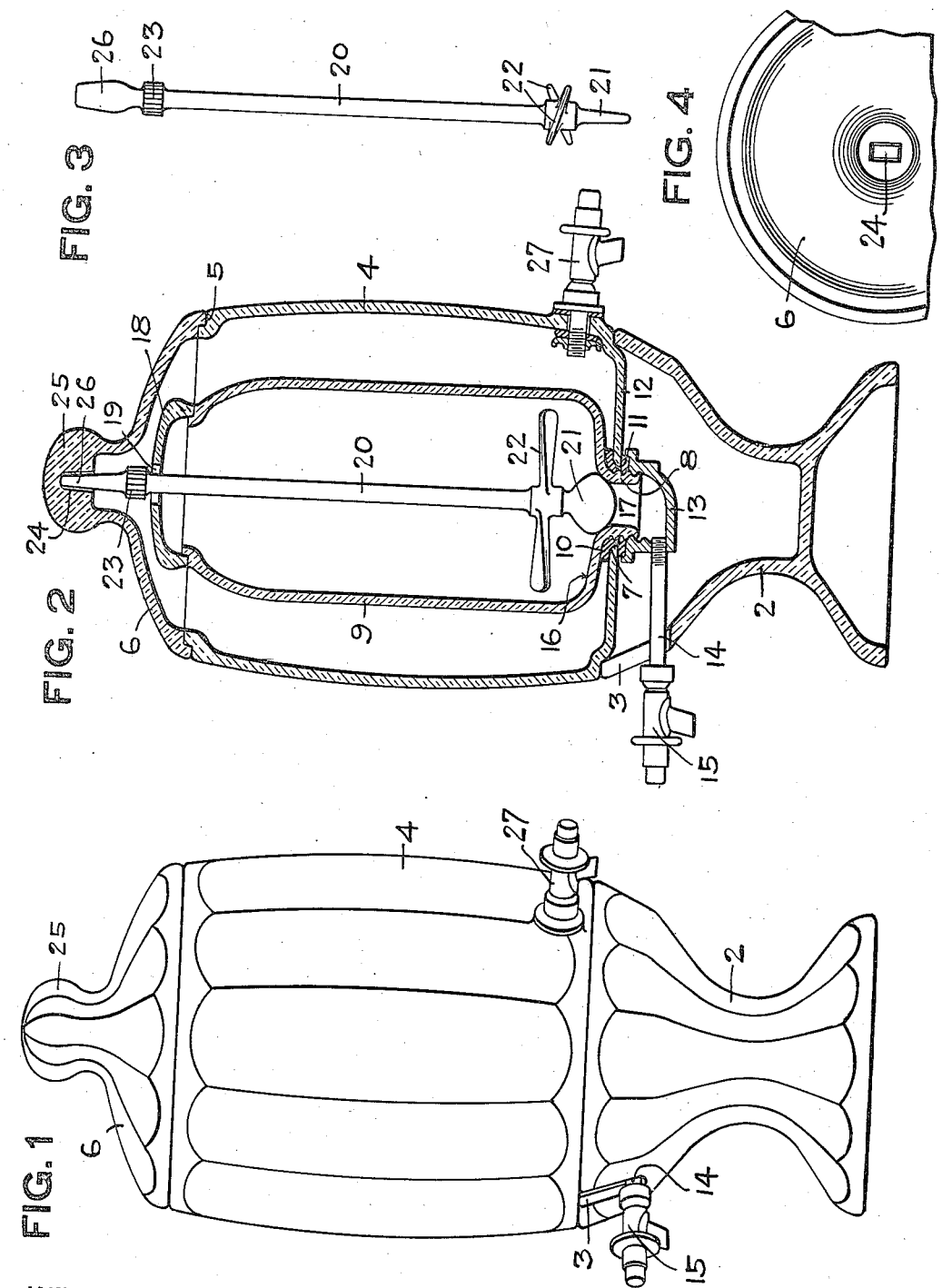

ARCH K. WOOD, OF JEANNETTE, PENNSYLVANIA, ASSIGNOR TO McKEE GLASS COMPANY, OF JEANNETTE, PENNSYLVANIA, A CORPORATION OF PENNSYLVANIA.

LIQUID-COOLER.

1,287,164.

Specification of Letters Patent. Patented Dec. 10, 1918.

Application filed February 28, 1916. Serial No. 80,951.

*To all whom it may concern:*

Be it known that I, ARCH K. WOOD, a citizen of the United States, and resident of Jeannette, in the county of Westmoreland and State of Pennsylvania, have invented a new and useful Improvement in Liquid-Coolers; and I do hereby declare the following to be a full, clear, and exact description thereof.

My invention relates to liquid coolers, and more especially to that type in which there is an outer vessel for containing the ice, and an inner vessel for containing the liquid to be cooled.

The object of my invention is to provide a simple and efficient means of securing the inner vessel within the outer vessel so as to be held firmly in position and, at the same time, providing a joint which will insure against leakage. A further object is to provide for the stirring up of the liquid in the inner vessel from time to time as may be necessary, and that without removing the main cover or lid.

In the drawings, Figure 1 is a vertical elevation of my improved cooler; Fig. 2 is a vertical section; Fig. 3 is a view of the stirrer removed; Fig. 4 is a plan view of a portion of the inner face of the lid.

In the drawing, the numeral 2 designates the base which is preferably formed of glass, said base having the opening 3.

Resting on said base is the outer vessel 4, which is to contain the ice, and said vessel has at its upper end the shoulder 5 to receive the cover or lid 6. The cover 6 rests loosely on the vessel and may be readily turned by hand, for the reasons more fully hereinafter set forth.

At the lower end of the outer vessel 4 is the opening 7 through which the threaded neck 8 of the inner vessel 9 projects. Rubber gaskets 10 and 11 surround the neck 8 both inside and outside the vessel 4, said gaskets bearing against the inner and outer faces of the bottom 12 thereof.

The neck 8 is screwed into the elbow 13. By turning the vessel 9, the gaskets are compressed in such a way as to prevent leakage, and the elbow is drawn up from below to add to the security of the joint.

A spout 14 is tapped into the elbow and said spout extends out through the opening 3 and is provided with a suitable faucet 15.

The lower end of the inner vessel 9 slopes as at 16 toward the outlet 17 so that the draining of the entire contents of the inner vessel is insured, and there is no opportunity for sediment or foreign matter to collect in the bottom of the inner vessel, and the cooler is thus kept in sanitary condition.

A lid 18 is provided for the upper end of the inner vessel 9, and said lid has the opening 19.

A stirrer 20 is contained within the vessel 9, said stirrer having the flat portion 21 at the lower end thereof, which is adapted to rest over the outlet 17, and said stirrer is further provided with the blades 22. The stirrer projects up through the opening 19 in the lid 18, and beyond said lid is provided with the milled portion 23 for convenience in rotating the stirrer when the main lid 6 has been removed; but provision is made for stirring without the removal of the main lid by extending the stirrer up into the recess 24 in the knob 25 of the lid 6. This recess is angular in section, as indicated in Fig. 4, and the extension 26 of the stirrer is shaped to fit within said recess so that upon turning the lid 6 by grasping the knob 25, the stirring of the liquid within the vessel 9 may be accomplished without removing the lid 6. This is of special convenience where the inner vessel contains buttermilk or some liquid which needs to be stirred from time to time.

A faucet 27 is provided for drawing off the liquid from the outer vessel 4, and the location of the faucet 27 with reference to the faucet 15 may be provided for before the joint between the inner vessel and the outer vessel is tightened. In this way, the faucet 27 may be moved around in close proximity to the faucet 15 so that where pure, clean ice is employed in the outer vessel, the liquid may be drawn off from the outer vessel for drinking purposes.

What I claim is:

1. In a liquid-cooler, the combination of an inner and an outer vessel, said inner vessel having a contracted outlet at the lower end thereof, a drawing-off device connected up with said outlet, a stirrer in said vessel resting on the shoulder formed by the contracted outlet on the lower end of said inner vessel, a lid on the outer vessel having a recess on the inner face thereof, said lid merely resting on said vessel and freely rotatable by hand and the upper end of said stirrer entering said recess, and non-rotatable therein.

2. In a liquid-cooler, the combination of an inner and outer vessel, the inner vessel having a contracted discharge opening at the lower end thereof, a drawing-off device connected up with said opening, a stirrer in said inner vessel having an enlarged flat portion at the lower end engaging the shoulder formed by the contracted discharge opening of said inner vessel, a lid on said outer vessel having an angular recess formed on the inner face thereof, said lid merely resting on said vessel and freely rotatable by hand and the upper end of said stirrer having a portion adapted to enter said angular seat, and non-rotatable therein.

3. In a liquid-cooler, the combination of an inner and outer vessel, the inner vessel having an opening at the lower end thereof, a drawing-off device connected up with said opening, a stirrer in said inner vessel engaging the outlet of said inner vessel at its lower end, a lid on said outer vessel having a knob portion, said lid merely resting on said vessel and freely rotatable by hand, said knob portion having a recess formed therein, and the upper end of said stirrer engaging said recess and non-rotatable therein.

In testimony whereof I, the said ARCH K. WOOD, have hereunto set my hand.

ARCH K. WOOD.

Witnesses:
JOHN F. WILL,
I. F. GEYER.